(12) United States Patent
Jensen et al.

(10) Patent No.: US 8,132,258 B1
(45) Date of Patent: Mar. 6, 2012

(54) REMOTE SECURITY SERVERS FOR PROTECTING CUSTOMER COMPUTERS AGAINST COMPUTER SECURITY THREATS

(75) Inventors: Wayne Jens Jensen, Morgan Hill, CA (US); Shaohong Wei, Sunnyvale, CA (US)

(73) Assignee: Trend Micro Incorporated, Tokyo (JP)

( * ) Notice: Subject to any disclaimer, the term of this patent is extended or adjusted under 35 U.S.C. 154(b) by 937 days.

(21) Appl. No.: 12/137,870

(22) Filed: Jun. 12, 2008

(51) Int. Cl.
  *G06F 12/14* (2006.01)
(52) U.S. Cl. .......................... 726/24; 713/188
(58) Field of Classification Search .............. 726/22–25; 713/188
  See application file for complete search history.

(56) References Cited

U.S. PATENT DOCUMENTS

| | | | |
|---|---|---|---|
| 6,021,510 A | 2/2000 | Nachenberg | |
| 6,094,731 A | 7/2000 | Waldin et al. | |
| 6,745,192 B1 | 6/2004 | Libenzi | |
| 6,748,538 B1 | 6/2004 | Chan et al. | |
| 6,847,995 B1 | 1/2005 | Hubbard et al. | |
| 7,096,493 B1 | 8/2006 | Liu | |
| 7,143,113 B2 | 11/2006 | Radatti | |
| 7,185,015 B2 | 2/2007 | Kester et al. | |
| 7,203,959 B2 | 4/2007 | Nachenberg et al. | |
| 7,328,349 B2 * | 2/2008 | Milliken ........................ | 713/181 |
| 7,337,471 B2 | 2/2008 | Nachenberg et al. | |
| 7,373,643 B2 | 5/2008 | Radatti | |
| 7,877,806 B2 * | 1/2011 | Repasi et al. ................... | 726/23 |
| 2007/0101146 A1 | 5/2007 | Louch et al. | |
| 2007/0150948 A1 | 6/2007 | De Spiegeleer | |
| 2007/0162463 A1 | 7/2007 | Kester et al. | |
| 2007/0174909 A1 | 7/2007 | Burchett et al. | |
| 2007/0234343 A1 | 10/2007 | Gouge et al. | |
| 2007/0240218 A1 | 10/2007 | Tuvell et al. | |
| 2007/0244920 A1 | 10/2007 | Palliyil et al. | |
| 2008/0033942 A1 | 2/2008 | Kao et al. | |
| 2008/0092235 A1 | 4/2008 | Comlekoglu | |
| 2008/0095065 A1 | 4/2008 | Albrecht | |

OTHER PUBLICATIONS

Cai et al., "Different-Strategy Management of Malicious Nodes in Peeer-to-Peer Network", Published in 2009, IEEE Conference (vol. 2).*
Binary diff/patch utility, 1 sheet [retrieved on May 30, 2008]. Retrieved from the Internet: http://www.daemonology.net/bsdiff/.
Summary Cache: A Scalable Wide-Area Web Cache Sharing Protocol, 2 sheets [retrieved on May 21, 2008]. Retrieved from the internet: http://pages.cs.wisc.edu/~cao/papers/summary-cache/share.html.
Bloom Filters—the math, 6 sheets [retrieved on May 22, 2008]. Retrieved from the internet: http://pages.cs.wisc.edu/~cao/papers/summary-cache/node8.html.
Bloom Filters, 7 sheets [retrieved on May 21, 2008]. Retrieved from the internet: http://en.wikipedia.org/wiki/Bloom_filter.

* cited by examiner

*Primary Examiner* — Kambiz Zand
*Assistant Examiner* — Amare F Tabor
(74) *Attorney, Agent, or Firm* — Okamoto & Benedicto LLP

(57) ABSTRACT

A client computer may be configured to perform computer security operations in conjunction with a remotely located security server. Upon detection of a computer security event, such as reception of a file, the client computer may generate a query input and determine if the query input has corresponding security information in the security server. When the query input has corresponding security information, the client computer may forward the query input to the security server. In response, the security server may retrieve the security information using the query input and provide the security information to the client computer. As a particular example, the security event may be reception of a file in the client computer and the security information may indicate whether or not the file is infected with a computer virus.

19 Claims, 6 Drawing Sheets

REMOTE SECURITY SERVERS FOR PROTECTING CUSTOMER COMPUTERS AGAINST COMPUTER SECURITY THREATS

BACKGROUND OF THE INVENTION

1. Field of the Invention

The present invention relates generally to computer security, and more particularly but not exclusively to methods and apparatus for combating computer security threats.

2. Description of the Background Art

Generally speaking, computer security involves protection of computers and user information against malicious codes and online threats. Malicious codes may include computer viruses, trojans, spywares, worms, rootkits, and the like. Online threats may include malicious websites, network intrusion, denial of service attacks, pharming, phishing, spam, eavesdropping, and various online fraudulent schemes. Traditional computer security products may include a client-based scan engine and a pattern file that is periodically updated to keep it current. Both the scan engine and the pattern file are on a customer client or server computer. For example, the scan engine may be configured for virus scanning and the pattern file may comprise a database of signatures of known viruses. The scan engine and the pattern file may be used in conjunction with a pattern-matching algorithm to scan a file for computer viruses. The pattern file is continually updated to keep up with newly discovered viruses, increasing the size of the pattern file and the processing requirements of the scan engine.

SUMMARY

A client computer may be configured to perform computer security operations in conjunction with a remotely located security server. Upon detection of a computer security event, such as reception of a file, the client computer may generate a query input and determine if the query input has corresponding security information in the security server. When the query input has corresponding security information, the client computer may forward the query input to the security server. In response, the security server may retrieve the security information using the query input and provide the security information to the client computer. As a particular example, the security event may be reception of a file in the client computer and the security information may indicate whether or not the file is infected with a computer virus.

These and other features of the present invention will be readily apparent to persons of ordinary skill in the art upon reading the entirety of this disclosure, which includes the accompanying drawings and claims.

The use of the same reference label in different drawings indicates the same or like components.

DETAILED DESCRIPTION

In the present disclosure, numerous specific details are provided, such as examples of apparatus, components, and methods, to provide a thorough understanding of embodiments of the invention. Persons of ordinary skill in the art will recognize, however, that the invention can be practiced without one or more of the specific details. In other instances, well-known details are not shown or described to avoid obscuring aspects of the invention.

Being computer-related, it can be appreciated that some components disclosed herein may be implemented in hardware, software, or a combination of hardware and software (e.g., firmware). Software components may be in the form of computer-readable program code stored in a computer-readable storage medium, such as memory, mass storage device, or removable storage device. For example, a computer-readable storage medium may comprise computer-readable program code for performing the function of a particular component. Likewise, computer memory may be configured to include one or more components, which may be executed by a processor. Software components may be implemented in logic circuits, for example. Components may be implemented separately in multiple modules or together in a single module.

Figure 1:
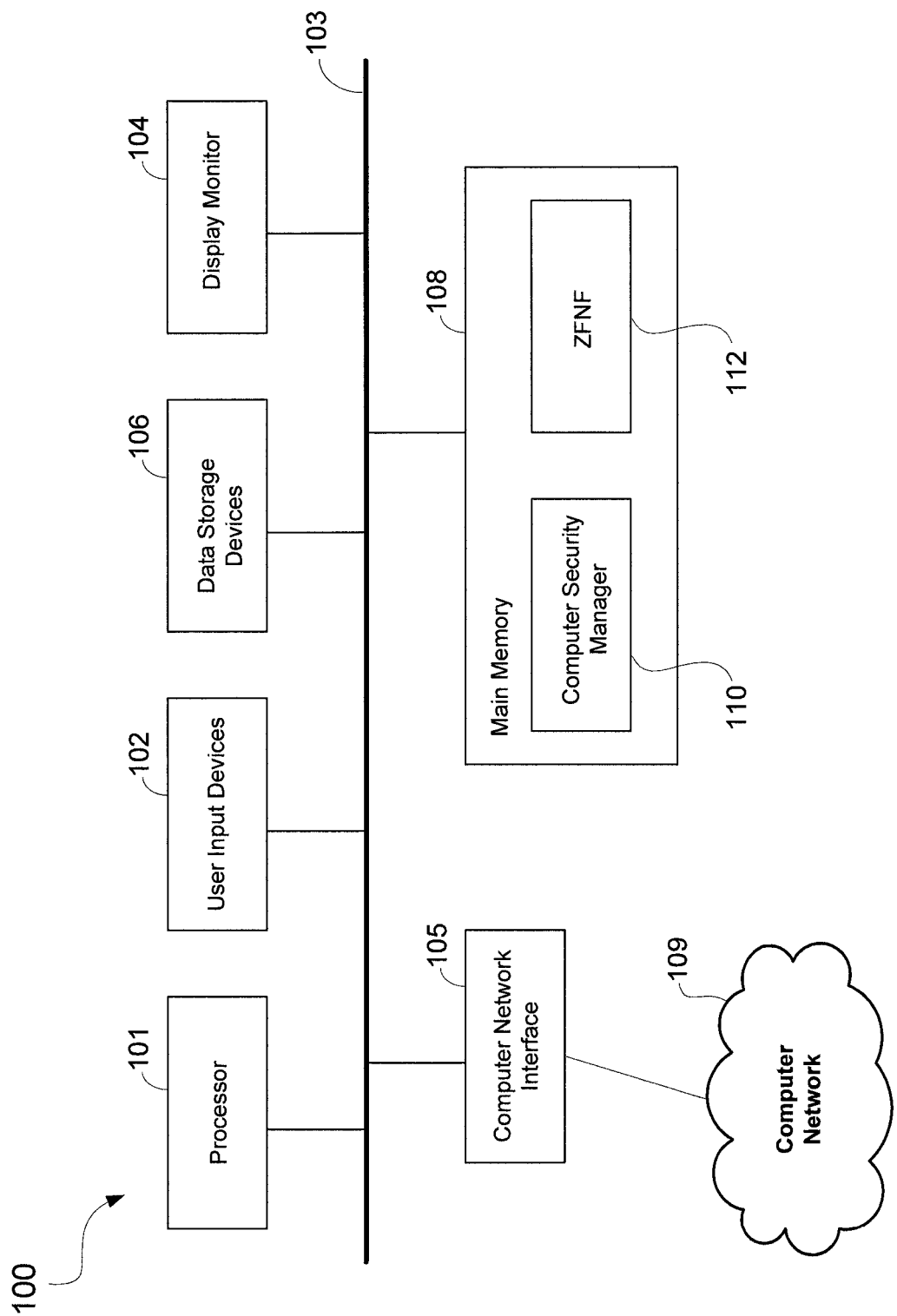
FIG. 1 shows a schematic diagram of a client computer in accordance with an embodiment of the present invention.

FIG. 1 shows a schematic diagram of a client computer 100 in accordance with an embodiment of the present invention. The computer 100 may be a customer computer in that it may be owned or operated by a customer of a computer security vendor providing a computer security manager 110 and associated components. For example, the computer 100 may be a desktop computer, a gateway, or a server computer. The computer 100 is a client relative to a remote security server 212 and an update server 210 (see FIG. 2) in a client-server architecture.

The computer 100 may have less or more components to meet the needs of a particular application. In the example of FIG. 1, the computer 100 may include a processor 101, such as those from the Intel Corporation or Advanced Micro Devices, for example. The computer 100 may have one or more buses 103 coupling its various components. The computer 100 may include one or more user input devices 102 (e.g., keyboard, mouse), one or more data storage devices 106 (e.g., hard drive, optical disk, USB memory), a display monitor 104 (e.g., LCD, flat panel monitor, CRT), a computer network interface 105 (e.g., network adapter, modem), and a main memory 108 (e.g., RAM). The computer network interface 105 may be coupled to a computer network 109, which in this example includes the Internet.

In the example of FIG. 1, the main memory 108 includes the computer security manager 110 and a zero false negative filter (ZFNF) 112. The computer security manager 110 may have other associated components depending on implementation. The computer security manager 110 and the ZFNF 112 may be loaded from the data storage device 106 to the main memory 108 for execution by the processor 101.

The computer security manager 110 may comprise computer-readable program code for protecting the computer 100 against computer security threats, such as malicious codes and online threats. In one embodiment, the computer security manager 110 is configured to detect for malicious codes, such as computer viruses. The computer security manager 110 may also be configured to perform other computer security functions.

In one embodiment, the computer security manager 110 is configured to detect computer security events, to generate query inputs based on the security events, and forward the query inputs to the ZFNF 112. The ZFNF 112 may filter the query inputs and forward the filtered query inputs to a remotely located security server. The security server may use the filtered query inputs to query its security database to retrieve security information corresponding to the query inputs. The security server may forward the security information to the computer 100 for receipt by the computer security manager 110. The computer security manager 110 may be configured to analyze the security information to determine if the computer security event that initiated the query poses a security threat. If so, the computer security manager 110 may be configured to perform one or more remedial actions, such as disinfection, quarantine, or removal.

As can be appreciated, the computer security manager 110 allows for computer security operations without having to perform the bulk of the operation in the computer 100. For example, the computer security manager 110 may be configured to perform antivirus operations without having to perform pattern matching in the computer 100. More specifically, the computer security manager 110 may perform an antivirus operation on a file by using characteristics of the file (e.g., CRC (cyclic redundancy check) hash of the file) as query inputs and providing the query inputs to the security server, which uses the query inputs to search its security database for viruses that leave the same characteristics on infected files. This allows the computer security manager 110 to protect the computer 100 without the burden of locally maintaining a pattern file and running complex scanning operations.

One problem with using a remotely located security server to perform computer security operations for the client computer 100 is that communication between the computer 100 and the security server consumes computer network bandwidth, which increases the monetary cost of performing computer security operations. Another problem has to do with the delay or latency in receiving a response from the security server. The ZFNF 112 addresses these potential issues.

The ZFNF 112 may comprise computer-readable program code for determining whether or not a query input has corresponding security information in the remote security server. In one embodiment, the ZFNF 112 is configured to filter query inputs such that only those that have corresponding entries in the security database of the remote security server are forwarded from the computer 100 to the security server. In effect, the ZFNF 112 serves as a query filter for the security database. The ZFNF 112 is so named because, for any given set of security information in the security server, the ZFNF 112 may be configured such that it does not generate a false negative. A false negative is an indication that the security server has no security information for a query input when the security server actually has one. As can be appreciated, it may still be possible for the ZFNF 112 to erroneously indicate that the security server has no corresponding security information for a query input when the ZFNF 112 is not current, i.e., the set of security information from which the ZFNF 112 was generated has been changed. Accordingly, the ZFNF 112 is preferably updated when security information in the security server is updated.

Figure 2:
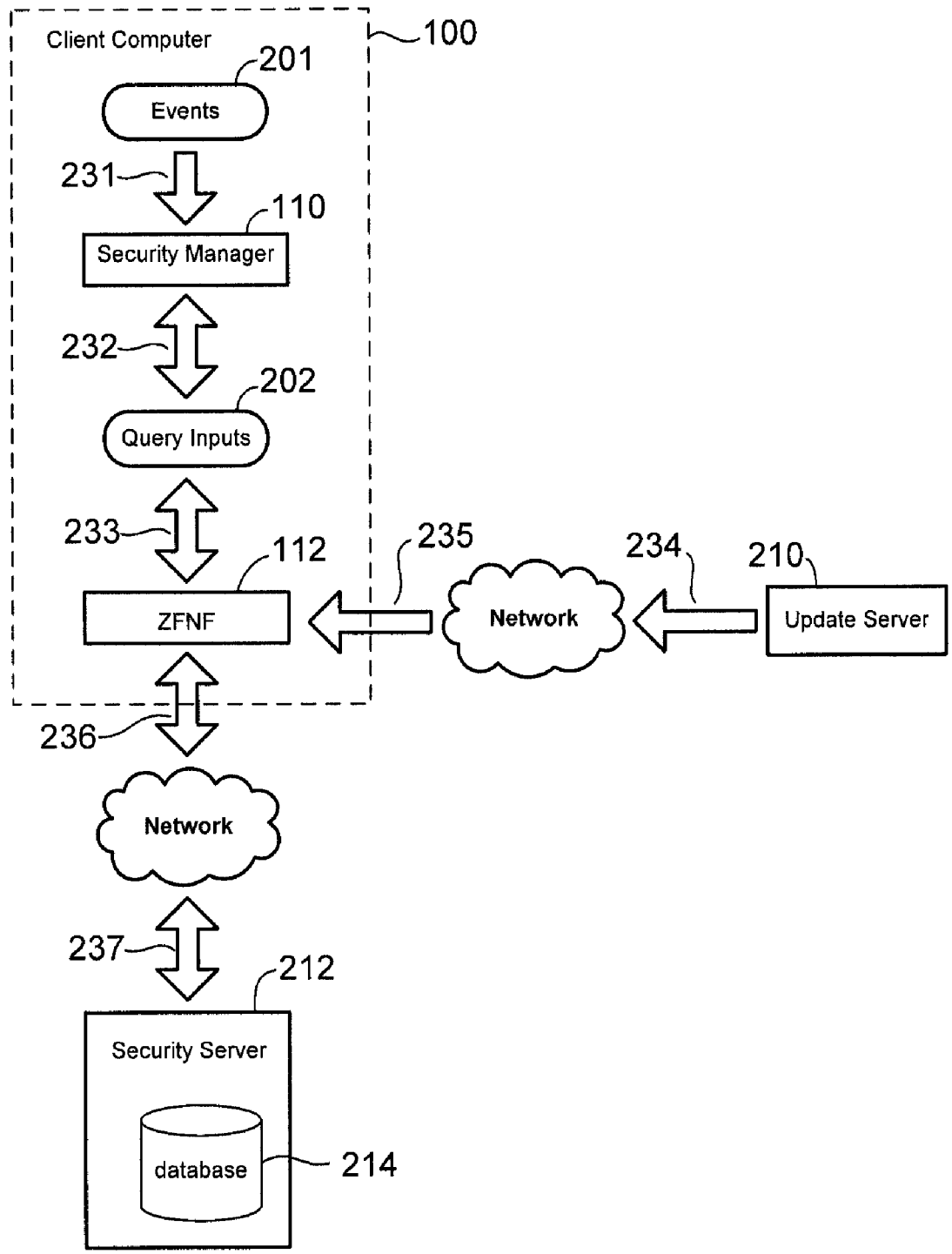
FIG. 2 schematically shows a system for protecting computers against computer security threats in accordance with an embodiment of the present invention.

FIG. 2 schematically shows a system for protecting computers against computer security threats in accordance with an embodiment of the present invention. In the example of FIG. 2, the security server 212 and the update server 210 may each comprise a single server computer or a network of server computers that are remotely located from the client computer 100. The security server 212 and the update server 210 are remotely located in that they are physically separated from the client computer 100 and communicate with the client computer 100 over a computer network. For example, the client computer 100 may be part of a private computer network, whereas the security server 212 and the update server 210 may be outside the private computer network but accessible over the Internet. As another example, the client computer 100 and the security server 212 may belong to the same private computer network, with the update server 210 being accessible over the Internet.

In the example of FIG. 2, the computer security manager 110 detects computer security events 201 in the computer 100 (arrow 231). The security events 201 may comprise events that may lead to introduction of malicious codes in the computer 100. For example, the security events 201 may include receiving a new file in the computer 100 by way of removable storage medium or over a computer network.

In response to detecting a security event 201, the computer security manager 110 generates one or more query inputs 202 for determining whether the security event 201 poses a computer security threat. In the case where the event 201 comprises receiving new files in the computer 100, the computer security manager 110 may generate a CRC hash for a portion or entirety of each of the files and use the CRC hashes as query inputs. In this example, the security database 214 of the security server 212 includes CRC hashes of known viruses or infected files. The security server 212 may use the CRC hashes generated by the computer security manager 110 to query the security database 214 to determine if one or more of the received files are infected.

To reduce network traffic and improve latency, the security manager 110 forwards the query inputs 202 to the ZFNF 112 rather than directly to the security server 212 (arrows 232 and 233). The ZFNF 112 identifies query inputs 202 that do not have corresponding security information in the security server 212 and removes those from the query inputs 202 to be provided to the security server 212. For example, the ZFNF 112 may determine if any query input 202 received from the security manager 110 does not have a corresponding entry in the security database 214. The ZFNF 112 may generate filtered query inputs 202 that includes query inputs 202 from the security manager 110 minus query inputs 202 that do not have corresponding entries in the security database 214. Forwarding the filtered query inputs 202 to the security server 212 advantageously reduces network traffic by not having to transmit and process query inputs 202 with no corresponding security information in the security server 212. Query inputs 202 with no corresponding security information in the security server 212 may be deemed "safe" or "unknown," depending on the security level of the security manager 110.

The ZFNF 112 may be implemented using an algorithm that allows for determination of whether an element (e.g., query input 202) is a member of a set (e.g., set of query inputs 202 with corresponding entries in the database 214). The ZFNF 112 is preferably implemented using such algorithm that cannot result in false negatives for a given set of security information (e.g., for a given database 214). For example, the ZFNF 112 may be implemented using a Bloom filter. In that example, the ZFNF 112 cannot result in false negatives using the security database 214 for which the ZFNF 112 was generated. Other suitable algorithms may also be used without detracting from the merits of the present invention.

The update server 210 may comprise a single server computer or a network of server computers configured to provide updates to the ZFNF 112 to keep it current with the security database 214. This advantageously allows the ZFNF 112 to have zero false negatives. The update server 210 may periodically receive updates to the ZFNF 112 from the security server 212 and deliver the updates over a public computer network, such as the Internet (arrows 234 and 235). The updates to the ZFNF 112 may comprise updated filter bitmaps and hash functions that reflect data newly added to the security database 214. Alternatively an update to the ZFNF 112 may comprise a file containing the binary difference of the ZFNF 112 on the client computer 100 and the most up-to-date ZFNF maintained in the update server 210. The functionality of the update server 210 may also be implemented in the security server 212 without detracting from the merits of the present invention.

The ZFNF 112 may provide the filtered query inputs 202 to the computer security server 212 over a public computer network, such as the Internet (arrows 236 and 237). As can be appreciated, the filtered query inputs 202 may have less query inputs than the set of query inputs 202 originally received from the security manager 110. This reduces the number of query inputs 202 to be transmitted over the network and processed by the security server 212, thereby reducing network traffic and security operation latency. The security manager 110 may thus advantageously perform computer security operations with minimum delay, even when relying on a remote security server to perform the bulk of the security operations.

The security database 214 may comprise a relational database, a listing, or other data structure that stores or keeps track of security information. The security information may comprise signatures or patterns of known viruses, URLs (uniform resource locator) of malicious websites (e.g., hijacked websites or those especially setup for perpetrating online threats), mappings of URLs to categories of websites (e.g., identifying whether a website hosts pornography materials), and other information relating to detection, containment, and/or removal of malicious codes and online threats. In one embodiment, the security database 214 comprises a database of CRC hashes of known viruses. The CRC hashes represent the signature of the known viruses. In that example, the filtered query inputs 202 comprise one or more CRC hashes of files that triggered the events 201. A CRC hash may be performed on one or more portions of a file where a virus may be located. A CRC hash may also be performed on an entirety of a file depending on the virus being detected. A match between a CRC hash of a query input and a CRC hash in the security database 214 may indicate virus infection.

The security server 212 may query its security database 214 for security information corresponding to the filtered query inputs 202 received from the ZFNF 112. For example, if the filtered query inputs 202 comprise CRC hashes, the security server 212 may consult the security database 214 to determine if the CRC hashes are associated with particular known viruses. The security server 212 may forward the security information corresponding to filtered query inputs 202 to the security manager 110 directly or by way of the ZFNF 112, for example. The security information may indicate the name and description of a virus having a CRC hash matching that of a filtered query input 202.

Figure 3:
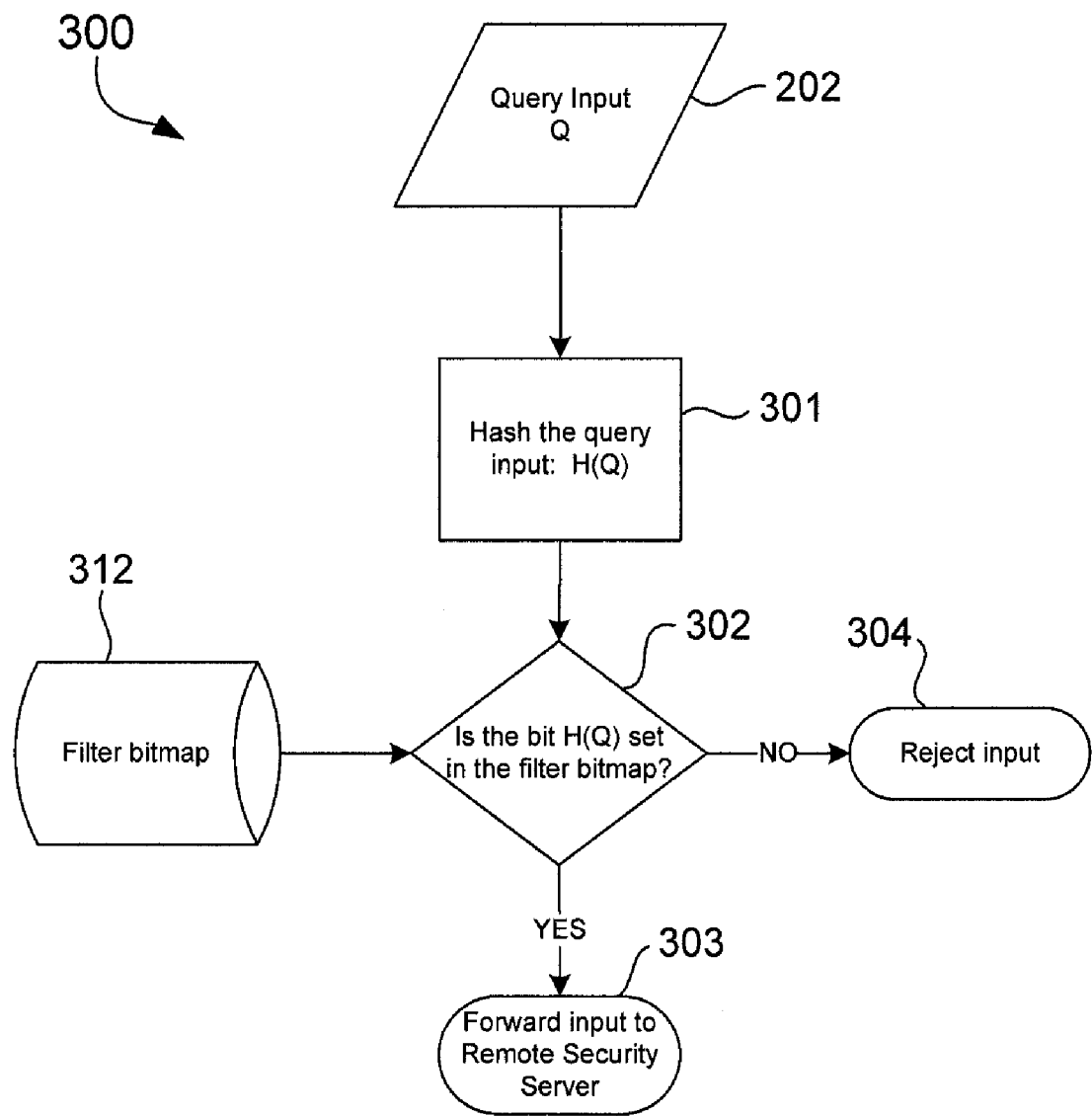
FIG. 3 shows a flow diagram of a method of generating filtered query inputs in accordance with an embodiment of the present invention.

FIG. 3 shows a flow diagram of a method 300 of generating filtered query inputs in accordance with an embodiment of the present invention. The method of 300 is explained using the components shown in FIG. 2 for illustration purposes only. Other components may also be used without detracting from the merits of the present invention. The method 300, which may be performed by the ZFNF 112, employs a Bloom filter comprising a filter bitmap 312 and a single hash function $H(Q)$.

Figure 4:
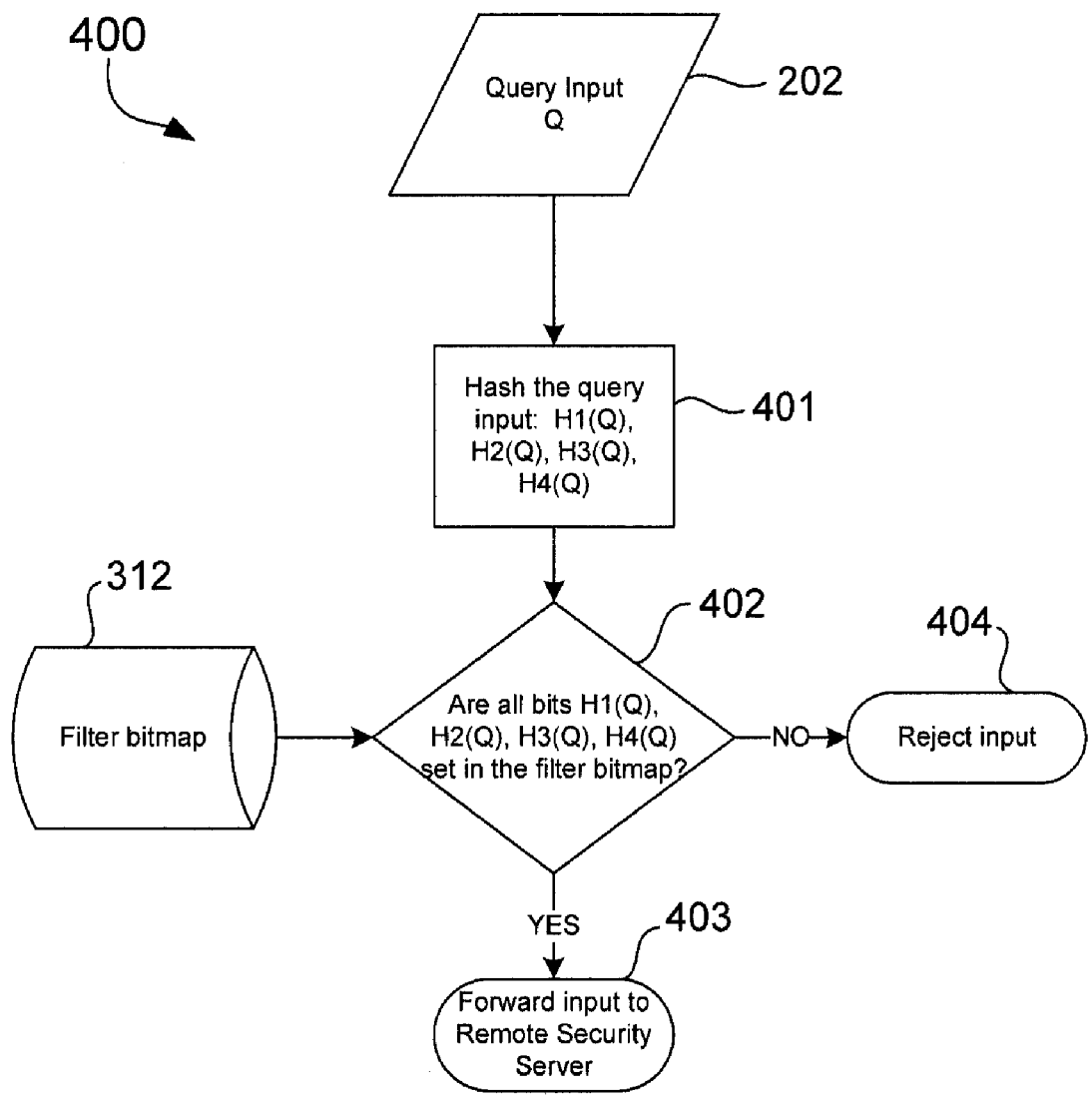
FIG. 4 shows a flow diagram of a method of generating filtered query inputs in accordance with another embodiment of the present invention.

Generally speaking, a Bloom filter is a data structure for set-membership testing that utilizes a fixed length vector and one or more hash functions. In the example of FIGS. 3 and 4, the Bloom filter comprises one or more hash functions $H1(Q)$, $H2(Q), \ldots, HN(Q)$ and the filter bitmap 312. The filter bitmap 312 may comprise a fixed length, multi-bit binary number. A query input Q is inserted into the Bloom filter by setting a logical 1 at bit positions in the filter bitmap 312 corresponding to $H1(Q), H2(Q), \ldots HN(Q)$. Every query input Q is processed through the hash functions $H1(Q), H2(Q), \ldots, HN(Q)$, where a query input Q is a member of a full set of query inputs Q. In the example of FIGS. 3 and 4, a query input Q comprises a query input in the set of query inputs having corresponding security information in the security database 214. To test if a particular query input Q has corresponding security information in the security database 214, the particular query input Q is processed through the hash functions $H1(Q), H2(Q), \ldots HN(Q)$. The result of each of the hash functions $H1(Q), H2(Q), \ldots HN(Q)$ comprises a bit position in the filter bitmap 312. If all of the bit positions indicated by the hash functions $H1(Q), H2(Q), \ldots HN(Q)$ are set (i.e., a logical 1) in the filter bitmap 312, the particular query input Q is deemed to have a corresponding security information in the security database 214. If any of the bit positions indicated by the hash functions $H1(Q), H2(Q), \ldots HN(Q)$ is not set (i.e., a logical 0) in the filter bitmap 312, the particular query input Q definitely does not have corresponding information in the security database 214.

Referring to FIG. 3, the security manager 110 generates a query input 202, labeled in this example as "Q", based on a detected security event. The ZFNF 112 receives the query input 202 and processes the query input 202 through a hash function $H(Q)$ (step 301). The result of the hash function $H(Q)$ is then compared to the filter bitmap 312 to determine if the query input 202 has a corresponding security information in the security server 212 (step 302). More specifically, the ZFNF 112 compares if the bit position result of the hash function $H(Q)$ is set in the filter bitmap 312. If so, the query input 202 is provided to the security server 212 (step 303). Otherwise, the query input 202 is not provided to the security server 212 to reduce latency and network bandwidth consumption (step 304). Note that only a single bit match is required in the example of FIG. 3 due to the use of a single hash function $H(Q)$.

The filter bitmap 312 may have several bits, with each bit position indicating whether or not a query input 202 has corresponding security information in the security server 212. The bitmap filter 312 may be created from a set of query inputs having corresponding security information, and may be updated when the query inputs and their security information are changed in a way that changes the bitmap filter 312.

As a particular example, the security database 214 may consist of 32-bit integers, with approximately 10 million integers that have security information. In the same example, the raw size of security information in the security database 214 is about 38 MB (megabytes) in length. The filter bitmap 312 may have 100 million entries and is about 12 MB in length. As can be appreciated, the filter bitmap 312 is smaller than the raw size of the security database 214. The filter bitmap 312 is thus much more suitable for use and storage locally in a customer client computer, such as the client computer 100. The hash function H(Q) in this example may be described by EQ. 1.

$$H(Q) = \text{raw\_size} \% 100,000,000 \quad (EQ. 1)$$

where raw_size is the raw size of the security information in the database 214. The ZFNF 112 may check whether the bit position result of the hash function H(Q) is set in the bitmap 312 to determine if the query input 202 has a corresponding entry in the security database 214.

FIG. 4 shows a flow diagram of a method 400 of generating filtered query inputs in accordance with another embodiment of the present invention. The method of 400 is explained using the components shown in FIG. 2 for illustration purposes only. Other components may also be used without detracting from the merits of the present invention. The method 400, which may be performed by the ZFNF 112, employs a Bloom filter comprising the filter bitmap 312 and four hash functions H1(Q), H2(Q), H3(Q), and H4(Q). Less or more hash functions may also be used. The Bloom filter of the method 400 operates similarly to the Bloom filter of the method 300 except for the use of four hash functions, and thus matching of all four bit result positions in the filter bitmap 312.

In the example of FIG. 4, the security manager 110 generates a query input 202, labeled in this example as "Q", based on a detected security event. The ZFNF 112 receives the query input 202 and processes the query input 202 through the hash functions H1(Q) to H4(Q) (step 401). The results of the hash functions H1(Q) to H4(Q) are then compared to the filter bitmap 312 to determine if the query input 202 has a corresponding security information in the security server 212 (step 402). More specifically, the ZFNF 112 determines if the bit position results of all of the hash functions H1(Q) to H4(Q0 are set in the filter bitmap 312. If so, the query input 202 is provided to the security server 212 (step 403). Otherwise, if any of the bit position results is not set in the filter bitmap 312, the query input 202 is not provided to the security server 212 to reduce latency and network bandwidth consumption (step 404).

As a particular example, the security database 214 may consist of 32-bit integers, with approximately 10 million integers that have security information. In that example, the raw size of security information in the security database 214 is about 38 MB (megabytes) in length. The filter bitmap 312 may have 50 million entries and is about 5.96 MB in length. As can be appreciated, the filter bitmap 312 is smaller than the raw size of the security database 214. As in FIG. 3, the filter bitmap 312 of FIG. 4 is much more suitable for use and storage locally in a customer client computer, such as the client computer 100. The hash functions H1(Q), H2(Q), H3(Q), and H4(Q) may return possible values of 0 to 49,999,999, with each of the value indicating a bit position in the filter bitmap 312.

Generally speaking, the size of the ZFNF 112 is dependent on the amount of security information in the remote security server 212, which in one embodiment is the number of entries in the security database 214. As an example, a Bloom filter for CRC matching may consume 5 bits per CRC if a target of 10% false positives is used, giving a ten fold improvement in false positive rate (down to 1%) while only increasing size per CRC to 10 bits.

Table 1 shows the changes in size required for storing a number of cyclic redundancy checks (first column) with a particular raw data size (second column) using a 10% false positive bitmap and hash approach (third column), a 10% false positive Bloom filter approach (fourth column), and a 1% false positive Bloom filter approach (fifth column). Using the first row of Table 1 as an example, 5 million CRC hashes would have a raw data size of 19.07 MB, which would consume a relatively large portion of a computer's storage memory. That same number of CRC hashes may be stored using as little as 2.98 MB of storage memory using a Bloom filter with a 10% false positive.

TABLE 1

| Number of CRCs | Raw data size MB | Bitmap (10% f.p.) MB | Bloom filter (10% f.p.) MB | Bloom filter (1% f.p.) |
|---|---|---|---|---|
| 5 million | 19.07 | 5.96 | 2.98 | 5.96 |
| 10 million | 38.15 | 11.92 | 5.96 | 11.92 |
| 50 million | 190.73 | 59.60 | 29.80 | 59.60 |
| 100 million | 381.47 | 119.21 | 59.60 | 110/21 |

Figure 5:
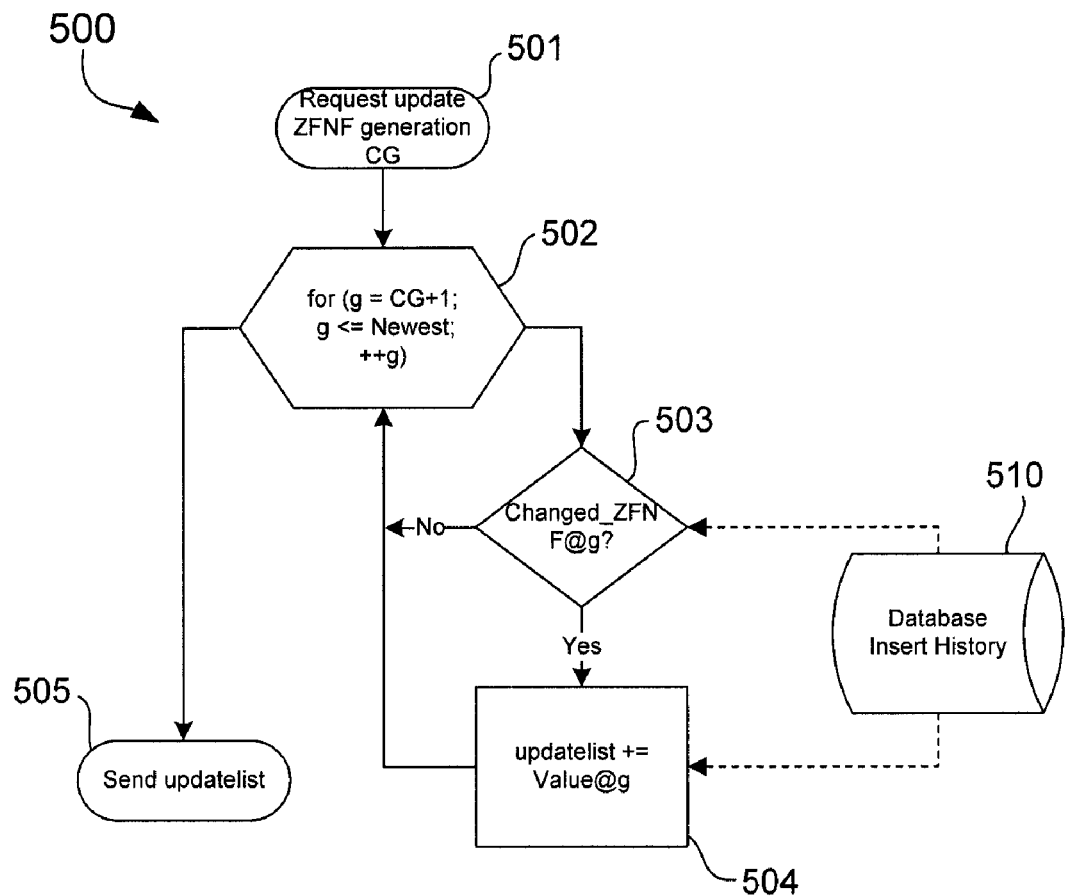
FIG. 5 shows a flow diagram of a method of updating a zero false negative filter in accordance with an embodiment of the present invention.

FIG. 5 shows a flow diagram of a method 500 of updating a ZFNF 112 in accordance with an embodiment of the present invention. The method of 500 is explained using the components shown in FIG. 2 for illustration purposes only. Other components may also be used without detracting from the merits of the present invention.

The method 500 may be performed by the update server 210. The method 500 may be implemented as computer-readable program code stored in memory and executed by a processor of the update server 210. The database insert history 510 may also be in data storage or the memory of the update server 210.

In the example of FIG. 5, the database insert history 510 comprises a database, listing, or other data structure that stores or keeps track of the update history of the security database 214. In one embodiment, the database insert history 510 includes information on changes made to each generation (i.e., version) of security database 214 and whether the changes changed the ZFNF 112 (e.g., its filter bitmap). Example contents of the database insert history 510 is shown in Table 2.

TABLE 2

| Generation | Value | Changed ZFNF? |
|---|---|---|
| 1 | ea2dcb8f | no |
| 2 | 5fc4f9b8 | no |
| 3 | cccfbf80 | no |
| 4 | 5be1e1b1 | yes |
| 5 | e2018a84 | no |

In the example of Table 2, the "Generation" column indicates a generation number, with 1 being the first generation and 5 the currently latest generation. The "Value" column indicates new data, such as new security information, added to the security database 214. The "Changed ZFNF?" column indicates whether addition of the new data changed the ZFNF 112. This allows for skipping of ZFNF 112 updates in cases where a change in the security database 214 does not change the ZFNF 112.

In FIG. 5, the client computer 100 sends an update request to the update server 210 (step 501). The update request may comprise a request for updates to a ZFNF 112 int the computer 100, including the current generation ("CG") of the ZFNF 112. For each generation of the ZFNF 112 that is newer than the current generation in the computer 100 (step 502), the update server 210 checks the database insert history 510 if the ZFNF 112 has been changed by new data added to the security database 214 (step 503) and, if the ZFNF 112 has been changed, enters the change to the ZFNF 112 in an update list (step 504). If the ZFNF 112 has not been changed by the new value added to the security database 214, there are no changes to the ZFNF 112 to be added to the update list (step 503 to step 502). The update server 210 sends to the computer 100 the update list containing changes to the ZFNF 112 brought by subsequent generations (step 505). In the computer 100, the security manager 110 applies the changes to its ZFNF 112 to update it to the newest generation.

For example, the security server 210 may employ binary patch tools, such as "bsdiff," to get the binary difference between different versions of ZFNFs 112. The difference may be put on the update server 210 as part of the update list for retrieval by client computers 100. A client computer 100 may use binary patch tools, such as "bspatch," to update its ZFNF 112 using the difference.

Figure 6:
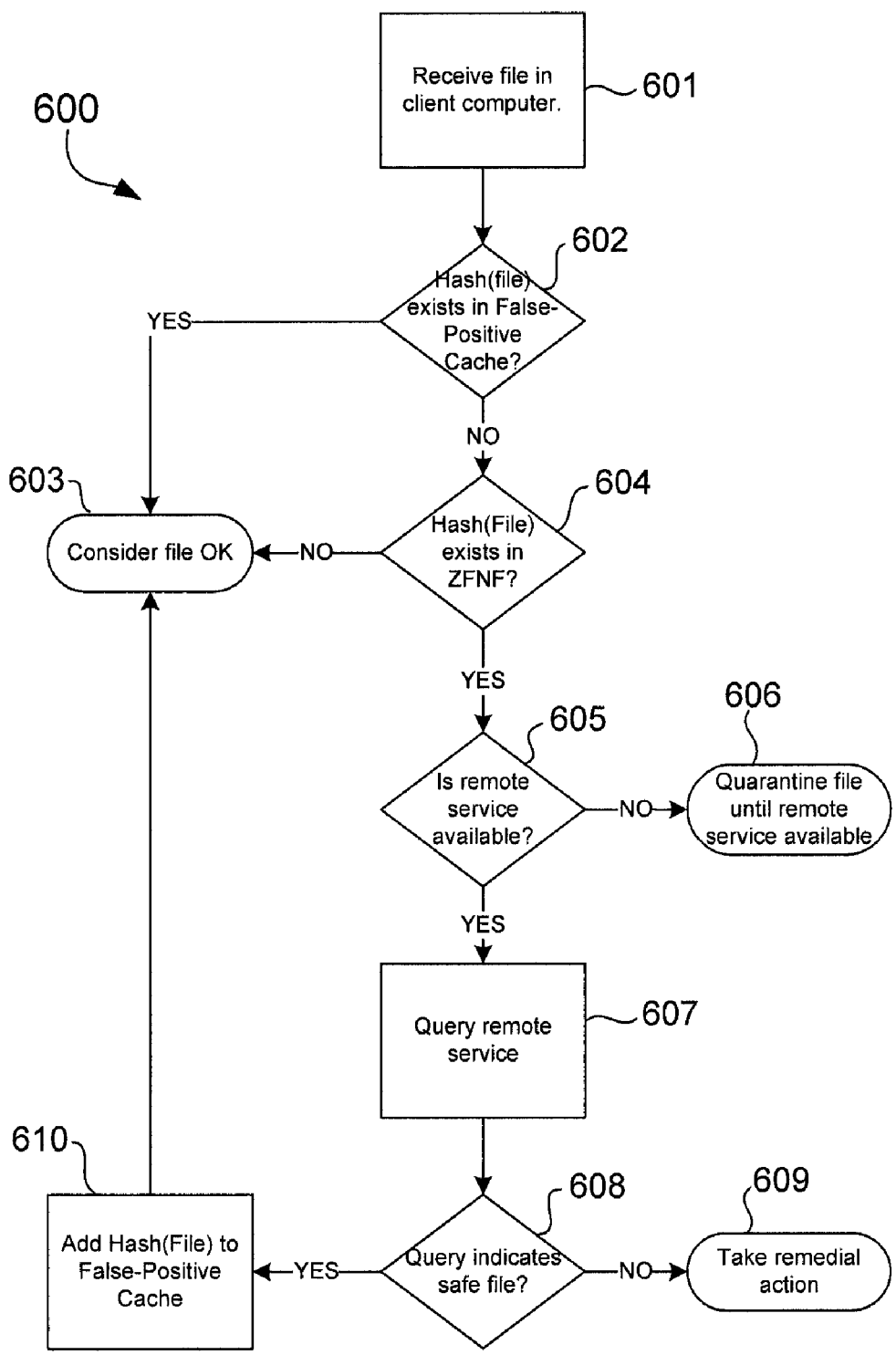
FIG. 6 shows a computer-implemented method of checking a file for computer viruses and other malicious codes in accordance with an embodiment of the present invention.

Referring now to FIG. 6, there is shown a computer-implemented method 600 of checking a file for computer viruses and other malicious codes in accordance with an embodiment of the present invention. The method 600 is described using the components shown in FIG. 2 for illustration purposes only. Other components may also be used without detracting from the merits of the present invention.

In the example of FIG. 6, the security manager 110 detects receipt of a file in the client computer 100 (step 601). The file may have been received from removable storage medium or over a local computer network, for example. In response, the security manager 110 generates a query input 202, which in this example may comprise a hash of the entire file or a portion of the file where a virus may be located. The security manager 110 then checks whether the hash of the file exists in a false positive cache (step 602). The false positive cache may comprise cache memory comprising hashes of files that the ZFNF 112 erroneously determined as having a corresponding entry in the security database 214. If the false positive cache has an entry for the hash of the file, the hash of the file has no corresponding entry in the security databse 214. In that case, the security manager 110 deems the file to be clean (i.e., not infected with a virus) (step 602 to step 603).

If the false positive cache has no entry for the hash of the file, the security manager 110 provides the hash of the file to the ZFNF 112, which determines if the hash of the file has a corresponding entry in the security database 214 (step 602 to step 604). If the hash of the file has no corresponding entry in the security database 214, the security manager 110 deems the file to be clean (step 604 to step 602).

If the hash of the file has a corresponding entry in the security database 214, the ZFNF 112 checks if it is possible to communicate with the remote security server 212 (step 605). If not, the ZFNF 112 may quarantine the file until it is possible to communicate with the security server 212 (step 606). Otherwise, the ZFNF 112 forwards the hash of the file to the remote security server 212, which queries the security database 214 for corresponding security information (step 607). The security server 212 provides the security information to the security manager 110 directly or by way of the ZFNF 112.

The security manager 110 reviews the security information corresponding to the hash of the file. If the security information indicates that the file is not infected with a virus, the security manager 110 enters the hash of the file in the false positive cache (step 608 to step 610) and deems the file to be clean (step 610 to step 603). Otherwise, if the security information indicates that the file is infected (e.g., having a CRC hash matching that of a known virus), the security manager 110 may take appropriate remedial action (step 608 to step 609). Such a remedial action may involve quarantine, removal, or disinfection of the file. The remedial action may also include alerting a user or administrator of the computer 100 or the network to which the computer 100 belongs. Other remedial actions may also be performed.

While specific embodiments of the present invention have been provided, it is to be understood that these embodiments are for illustration purposes and not limiting. Many additional embodiments will be apparent to persons of ordinary skill in the art reading this disclosure.

What is claimed is:

1. A computer-implemented method of checking a file for computer viruses, the method comprising:
    detecting reception of a file in a client computer;
    generating a query input for the file;
    in the client computer, determining if the query input has corresponding security information in a remotely located security server before the query input is transmitted from the client computer to the remotely located security server over a computer network;
    after determining that the query input has corresponding security information in the remotely located security server, transmitting the query input from the client computer to the remotely located security server over the computer network; and
    receiving security information in the client computer over the computer network, the security information indicating whether or not the file is infected with a computer virus.

2. The method of claim 1 wherein generating the query input for the file comprises:
    generating a hash of the file.

3. The method of claim 1 wherein the file is deemed not infected with the computer virus when the query input has no corresponding security information in the remotely located security server.

4. The method of claim 1 wherein the file is received in the client computer over the computer network.

5. The method of claim 1 wherein the query input comprises a CRC (cyclic redundancy check) hash of the file.

6. The method of claim 5 wherein the CRC hash is of a portion of the file likely to contain the computer virus.

7. The method of claim 1 wherein the file is quarantined in the client computer when communication cannot be established with the remotely located security server.

8. The method of claim 1 further comprising:
    taking remedial action when the security information received in the client computer indicates that the file is infected with the computer virus.

9. The method of claim 8 wherein the remedial action comprises quarantine of the file.

10. A client computer having memory and a processor configured to execute computer-readable program code in the memory, the memory comprising:
    a security manager comprising computer-readable program code for detecting malicious codes in the client computer; and
    a zero false negative filter comprising computer-readable program code for determining whether or not query inputs in a set of query inputs generated by the security manager in response to security events have corresponding security information in a remotely located security server, the zero false negative filter being configured to determine in the client computer whether or not any of the query inputs has corresponding security information in the remotely located security server before any of the query inputs is forwarded from the client computer to the security server over a computer network, to generate filtered query inputs comprising the set of query inputs minus query inputs with no corresponding security information in the remotely located security server, and to forward the filtered query inputs from the client computer to the remotely located security server over the computer network.

11. The client computer of claim 10 wherein the security events include receiving a file in the client computer and the filtered query inputs comprise hash of the file.

12. The client computer of claim 10 wherein the zero false negative filter forwards the filtered query inputs to the remotely located security server over the Internet.

13. The client computer of claim 10 wherein the zero false negative filter is generated from a security database comprising the security information.

14. The client computer of claim 13 wherein the zero false negative filter is updateable by an update server configured to provide updates to the zero false negative filter for changes to the security database that changes the zero false negative filter.

15. The client computer of claim 14 wherein the update server includes an update history of the security database and the zero false negative filter is not updated when the update history indicates that a change to the security database does not change the zero false negative filter.

16. A system for protecting computers against computer security threats, the system comprising:
 a client computer, the client computer being configured to generate a query input in response to a computer security event in the client computer, to determine if the query input has corresponding security information in a remotely located security server before the query input is forwarded to the security server, and to forward the query input to the security server over a computer network when the query input has the corresponding security information in the security server; and
 the security server configured to receive the query input, to use the query input to obtain the security information, and to provide the security information to the client computer, the security information indicating whether or not the security event poses a computer security threat.

17. The system of claim 16 wherein the client computer comprises a zero false negative filter generated from a security database comprising a set of security information pertaining to computer security threats, the zero false negative filter being configured to determine if the query input has corresponding information in the security server.

18. The system of claim 16 further comprising:
 an update server configured to provide updates to the zero false negative filter, the update server including an update history indicating if a change to the security database changed the zero false negative filter, the update server being configured to provide an update to the zero false negative filter for changes to the security database that changes the zero false negative filter.

19. The system of claim 16 wherein the computer security event comprises receiving a file in the client computer and the security information indicates whether or not the file is infected with a computer virus.

* * * * *